(12) United States Patent
Siegel et al.

(10) Patent No.: US 7,660,738 B1
(45) Date of Patent: Feb. 9, 2010

(54) COLLECTING COMPETITIVE PRICING INFORMATION VIA A MERCHANT WEB SITE FOR USE IN SETTING PRICES ON THE MERCHANT WEB SITE

(75) Inventors: Hilliard B. Siegel, Seattle, WA (US); Charles Gordon, Seattle, WA (US); Jeffrey P. Bezos, Greater Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 306 days.

(21) Appl. No.: 10/425,572

(22) Filed: Apr. 28, 2003

(51) Int. Cl.
*G06Q 20/00* (2006.01)

(52) U.S. Cl. .............................. 705/20; 705/26; 705/27; 705/400

(58) Field of Classification Search ............... 235/378; 177/25; 700/232, 238; 705/26, 27, 20, 400
See application file for complete search history.

(56) References Cited

U.S. PATENT DOCUMENTS

| | | | |
|---|---|---|---|
| 6,873,968 B2 * | 3/2005 | Ehrlich et al. .................. | 705/26 |
| 2002/0059101 A1 * | 5/2002 | Ratliff et al. ................... | 705/14 |
| 2002/0059262 A1 * | 5/2002 | Hsieh et al. .................. | 707/100 |
| 2002/0069118 A1 * | 6/2002 | Zylstra ......................... | 705/26 |
| 2006/0206394 A1 * | 9/2006 | Brown et al. .................. | 705/26 |

FOREIGN PATENT DOCUMENTS

WO WO0210961 * 2/2002

OTHER PUBLICATIONS

Sports Car Accessories store front; http://web.archive.org/web/19990223225155/http://sportscar-parts.com/ Feb. 23, 1999; pp. 1-3.*

Sparco kart racing gear; http://web.archive.org/web/19990209034025/www.sportscar-parts.com/spkart1.htm; Feb. 2, 1999; pp. 1-4.*

Product: Champion Sparco Kart suit; http://web.archive.org/web/19990219125210/www.sportscar-parts.com/Store/Browse/1000/...; Feb. 19, 1999; pp. 1-2.*

Sports Car Accessories, Seen a lower price? Get a better price!; http://web.archive.org/web/19990223202818/http://www.sportscar-parts.com/betterprice.html; Feb. 23, 1999; pp. 1-3.*

(Continued)

*Primary Examiner*—Jeffrey A. Smith
*Assistant Examiner*—Adam Levine
(74) *Attorney, Agent, or Firm*—Knobbe Martens Olson & Bear LLP

(57) ABSTRACT

A facility for collecting pricing information is described. The facility serves a web page to a client computing system. The served web page contains a first control operable to order a selected item from a selected vendor. The web page further contains a second control operable to submit a price charged for the selected item by a vendor other than the selected vendor. At a later time, the facility receives from the client computing system information that indicates that the second control has been operated to submit a price charged for the selected item by a vendor other than the selected vendor.

18 Claims, 11 Drawing Sheets

OTHER PUBLICATIONS

Furniture, Bush Furniture, Jewelry Armoire, Bush Entertainment Center, Powell Furniture . . . ; http://web.archive.org/web/20020922003344/http://everythingfurniture.com/ Sep. 22, 2002; pp. 1-2.*

Toscana Vanity Table, Mirror & Bench set; http://web.archive.org/web/20021017125044/http://www.everythingfurniture.com/vanitybe... October 17, 2002; pp. 1-2.*

Everything Furniture Better Price; http://web.archive.org/web/20020918181718/http://64.41.119.163/betterprice.htm September 18, 2002; p. 1.*

Better price; http://web.archive.org/web/20020204052843/http://www.sportscar-parts.com/betterprice.html; Feb. 4, 2002; pp. 1-2.*

\* cited by examiner

Found a lower price?

At Amazon.com, we're committed to offering you low prices, so we'd love to know if you found a better price for this item at another retailer. This is not a price-matching program, but we may use this information in making future pricing decisions for this item. *Please be aware that we do not provide individual follow-up responses.* After you submit your lower price, check back in a few days to see if our price has changed as a result.

steve, please fill out the following information. An answer to each question is required.

Handspring Visor Edge HotSync Cable
Price: $19.99

1. What was the item price found on the other retailer's Web site or in their store?
   Price: [____] (US$)

2. Does the price listed above include shipping and handling costs (read more about Amazon.com's free shipping policy)?
   ○ Yes  ○ No 3. What was the URL of the Web page or store that features the item at a lower price?
   URL: [_____]
   -or-
   Store Name: [_____]
   City: [_____]
   State/Province: [_____]
   Phone Number: [_____]

[Submit]

*FIG. 3B*

| item ID | number of submissions | merchant price | competitor A price | competitor B price | competitor C price | low price | seller | high price | seller | MSRP | cost | inventory | new merchant price |
|---|---|---|---|---|---|---|---|---|---|---|---|---|---|
| 36135 | 57 | $55.00 | $39.95 | $42.00 | | $39.95 | cA | $55.00 | m | $55.00 | $32.00 | 13 | |
| 09436 | 36 | $19.99 | $19.99 | $17.99 | $20.50 | $17.99 | cB | $20.50 | cC | $24.99 | $16.50 | 50 | |
| 29132 | 13 | $220.00 | | | $230.00 | $220.00 | m | $220.00 | m | $220.00 | $175.00 | 54 | |
| 54132 | 4 | $105.00 | $102.00 | $107.00 | $95.00 | $96.00 | cC | $107.00 | cB | | | 1 | |

FIG. 5

| item ID | number of submissions | merchant price | competitor A price | competitor B price | competitor C price | low price | seller | high price | seller | MSRP | cost | inventory | new merchant price |
|---|---|---|---|---|---|---|---|---|---|---|---|---|---|
| 36135 | 57 | $55.00 | $39.95 | $42.00 | | $39.95 | cA | $55.00 | m | $55.00 | $32.00 | 13 | |
| 09436 | 36 | $19.99 | $19.99 | $17.99 | $20.50 | $17.99 | cB | $20.50 | cC | $24.99 | $16.50 | 50 | $17.99 |
| 29132 | 13 | $220.00 | | | $230.00 | $220.00 | m | $220.00 | m | $220.00 | $175.00 | 54 | |
| 54132 | 4 | $105.00 | $102.00 | $107.00 | $95.00 | $96.00 | cC | $107.00 | cB | | | 1 | |

*FIG. 6*

| competitor | number of submissions |
|---|---|
| competitor E | 235 |
| competitor B | 101 |
| competitor C | 19 |
| competitor A | 1 |
| competitor D | 0 |

*FIG. 9*

COLLECTING COMPETITIVE PRICING INFORMATION VIA A MERCHANT WEB SITE FOR USE IN SETTING PRICES ON THE MERCHANT WEB SITE

TECHNICAL FIELD

The present invention is directed to the field of electronic commerce, and, more particularly, to the field of pricing decision support techniques.

BACKGROUND

The World Wide Web ("the Web") is a system for publishing information, in which users may use a web browser application to retrieve information, such as web pages, from web servers and display it.

The Web has increasingly become a medium used to shop for products. Indeed, thousands and thousands of different products—as well as other items such as service contracts—may be purchased on the Web. A user who plans to purchase an item on the Web can visit the web site of a web merchant that sells the item, view information about the item, give an instruction to purchase the item, and provide information needed to complete the purchase, such as payment and shipping information.

It is typical for a user to view information about a product on an "item detail page." The information provided on an item detail page may include such information as the item's name and source, a picture of the item, a description of the item, reviews or ratings of the item, a price at which the item is offered for sale, and a control—such as a button—that may be activated by the user to order the item from the web merchant.

In many senses, shopping at web merchants is significantly more compelling for shoppers than shopping at physical merchants. As one example, a shopper that is looking for the best price on a particular item may visit a number of different web merchants that carry the item in order to compare their prices. This process is made even more convenient by the use of a variety of shopping bots which the user may access in order to obtain the results of a price survey of a large number of web merchants.

This ability of shoppers to compare prices makes pricing among web merchants extremely competitive. A web merchant that sets its price for an item just a few percent above the prevailing low price may find it difficult to sell many units of the item.

For this reason, successful web merchants must invest significant effort and/or capital in researching and analyzing the prices being charged by other merchants for the items that it sells. This may involve such measures as hiring a significant number of employees to manually track down the price being charged for different items by various web vendors; building complicated automated systems to perform this research; or buying the results of such research at substantial prices from third-party research services. In addition, to use the results of any of these different techniques for researching competitive prices, they must be organized and presented in a manner that helps facilitate setting the web merchant's prices, which can also require substantial effort and/or expense.

In view of the foregoing, more efficient and reliable approaches to obtaining and presenting competitive pricing information would have significant utility.

BRIEF DESCRIPTION OF THE DRAWINGS

FIG. 3B is display diagram showing a second web page used in the first user interface to enable a shopper to enter competitive pricing information.

FIG. 5 is a report diagram showing a sample pricing report generated by embodiments of the facility.

FIG. 6 is a report diagram showing a sample pricing report after a user has entered a new merchant price.

FIG. 9 is a report diagram showing a sample competitive significance report generated by the facility.

DETAILED DESCRIPTION

Figure 1:
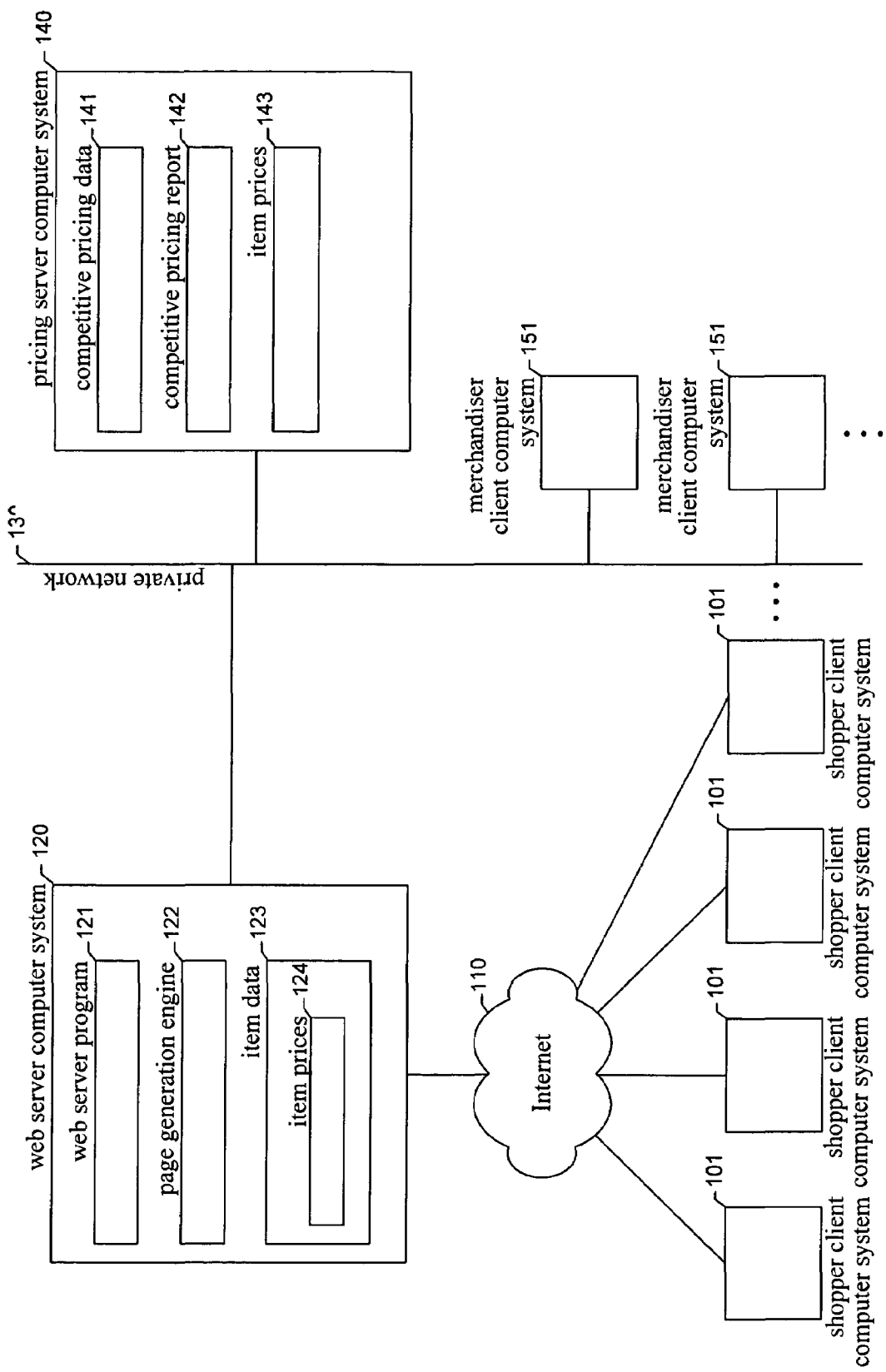
FIG. 1 is a block diagram showing a typical environment in which the facility operates.

A software facility for collecting, compiling, and displaying competitive pricing information ("the facility") is provided. In some embodiments, the facility collects competitive pricing data for a merchant by soliciting shopper pricing submissions from shoppers who are shopping at the merchant. As one example, for a web merchant, on item detail pages for some or all of the items offered for sale by the merchant, the facility includes a control for submitting a shopper pricing submission for the item. Shoppers typically use the control to identify a competitor selling the item described on the item detail page and a price at which the competitor is selling the item. In some cases, shoppers can be persuaded to submit a shopper pricing submission in instances where they spotted an item offered at a lower price by a competitor, but they would prefer to purchase the item at the merchant if the merchant offered the item at a price competitive with the competitor's.

By enlisting the assistance of shoppers to collect competitive pricing data in this manner, the merchant is often able to obtain competitive pricing data in a manner that offers some or all of the following benefits over conventional collection methods: (1) the merchant need not hire employees tasked with performing competitive pricing research or develop and operate automated systems to do so; (2) the merchant need not pay for third-party competitive pricing research; (3) the obtained competitive pricing information is more current than similar information obtained through conventional means; (4) the obtained competitive pricing information is more accurate than similar information obtained through conventional means; (5) the obtained competitive pricing information extends to a larger group of items than similar information obtained through conventional means; (6) the obtained competitive pricing information extends to a larger group of competitors than similar information obtained through conventional means; (7) the obtained competitive pricing information is better tailored to the group of items for which users that shop at the merchant tend to price-shop than is similar information obtained through conventional means; and (8) the obtained competitive pricing information is better tailored to the group of competitors at which users that shop at the merchant tend to price-shop than is similar information obtained through conventional means.

In some embodiments, the facility assembles shopper pricing submissions received from shoppers into a pricing report. This report shows, for each of a number of items sold by the merchant, prices being charged for the item by particular competitors. In some embodiments, the report also includes information about the merchant's sale of the item, including such information as the merchant's cost for the item, the merchant's current selling price for the item, and the merchant's current margin on the item. In some cases, the report is dynamic, enabling a merchandiser for the merchant to follow links in the report to review the merchant's item detail page for an item or a web page showing a competitor's pricing of the item, and/or enabling the merchandiser to modify the price being charged by the merchant for an item. In some embodiments, the report indicates a relative urgency for repricing the items shown in the report based upon the number of shopper price submissions submitted for each item, such as by sorting the items in accordance with the number of shopper price submissions submitted for each item. By presenting competitive pricing information in some or all of these ways, the facility provides more effective decision-support and decision-implementation tools to the merchant's merchandisers, enabling them to achieve a higher level of performance.

In an additional embodiment, the facility assesses the relative competitive significance of different competitors based upon the number of shopper price submissions submitted for each competitor. In a further embodiment, the facility uses pattern-matching techniques, together with item market price information—such as that collected via shopper pricing submissions—to predict a future crash in the market price of an item, and to recommend a price reduction by the merchant to a new price that is below the current price for the item to enable the merchant to liquidate its present inventory in the item in advance of the predicted market price crash.

FIG. 1 is a block diagram showing a typical environment in which the facility operates. A number of shopper client computer systems 101 are connected via the Internet 110 or another network to one or more web server computer systems 120. Each client computer system typically has a web client program for browsing web pages served by a web server program 121 on the web server computer system. A shopper client computer system may be used by a customer or other shopper to review item information provided by the web merchant, including item prices; order items from the web merchant; and/or submit user pricing submissions reporting prices being charged for an item by competing web merchants.

In addition to containing a web server program, the web server computer system typically also contains a page generation engine 122 for generating web pages served to shopper client computer systems by the web server program, including item detail pages for each of the items offered for sale by the merchant. The page generation engine generates a particular item detail page using item data 123 contained in the web server computer system, including item prices 124.

When the web server computer system receives a competitive pricing submission from a shopper client computer system, the web server computer system sends information from the submission via a private network 130, such as a LAN or a WAN, to a pricing server computer system 140, to be stored among other competitive pricing data 141. This competitive pricing data 141 can include data from earlier-received submissions, as well as data collected in other ways, such as by competitive review conducted by employees of the web merchant; automated research done by the web merchant; or data purchased by third-party reporting services. Periodically, the pricing server uses the competitive pricing data 142 to generate a competitive pricing report 142 as described further below. Users of merchandiser client computer systems 151 can review this competitive pricing report, and use it to set new item prices 143. Where new item prices 143 are set, they are transmitted back to the web server computer system, and substituted for the former item prices among the item data stored on the web server computer system.

While various functionalities and data are shown in FIG. 1 as residing on particular computer systems that are arranged in a particular way, those skilled in the art will appreciate that such functionalities and data may be distributed in various other ways across computer systems in different arrangements.

Figure 2:
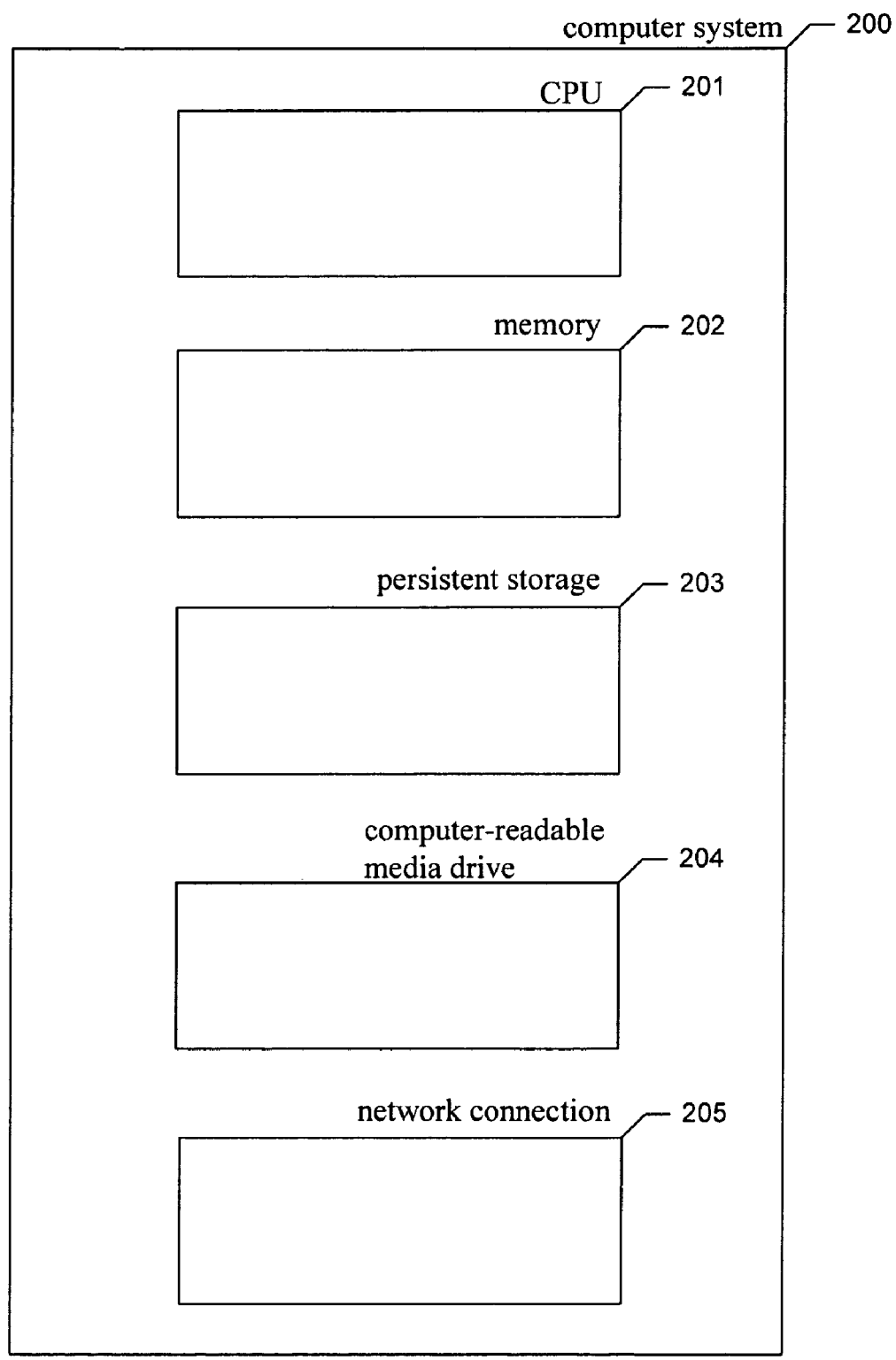
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes. These computer systems and devices 200 may include one or more central processing units ("CPUs") 201 for executing computer programs; a computer memory 202 for storing programs and data—including data structures—while they are being used; a persistent storage device 203, such as a hard drive, for persistently storing programs and data; a computer-readable media drive 104, such as a CD-ROM drive, for reading programs and data stored on a computer-readable medium; and a network connection 205 for connecting the computer system to other computer systems, such as via the Internet, to exchange programs and/or data—including data structures. While computer systems configured as described above are typically used to support the operation of the facility, one of ordinary skill in the art will appreciate that the facility may be implemented using devices of various types and configurations, and having various components.

Figure 3A:
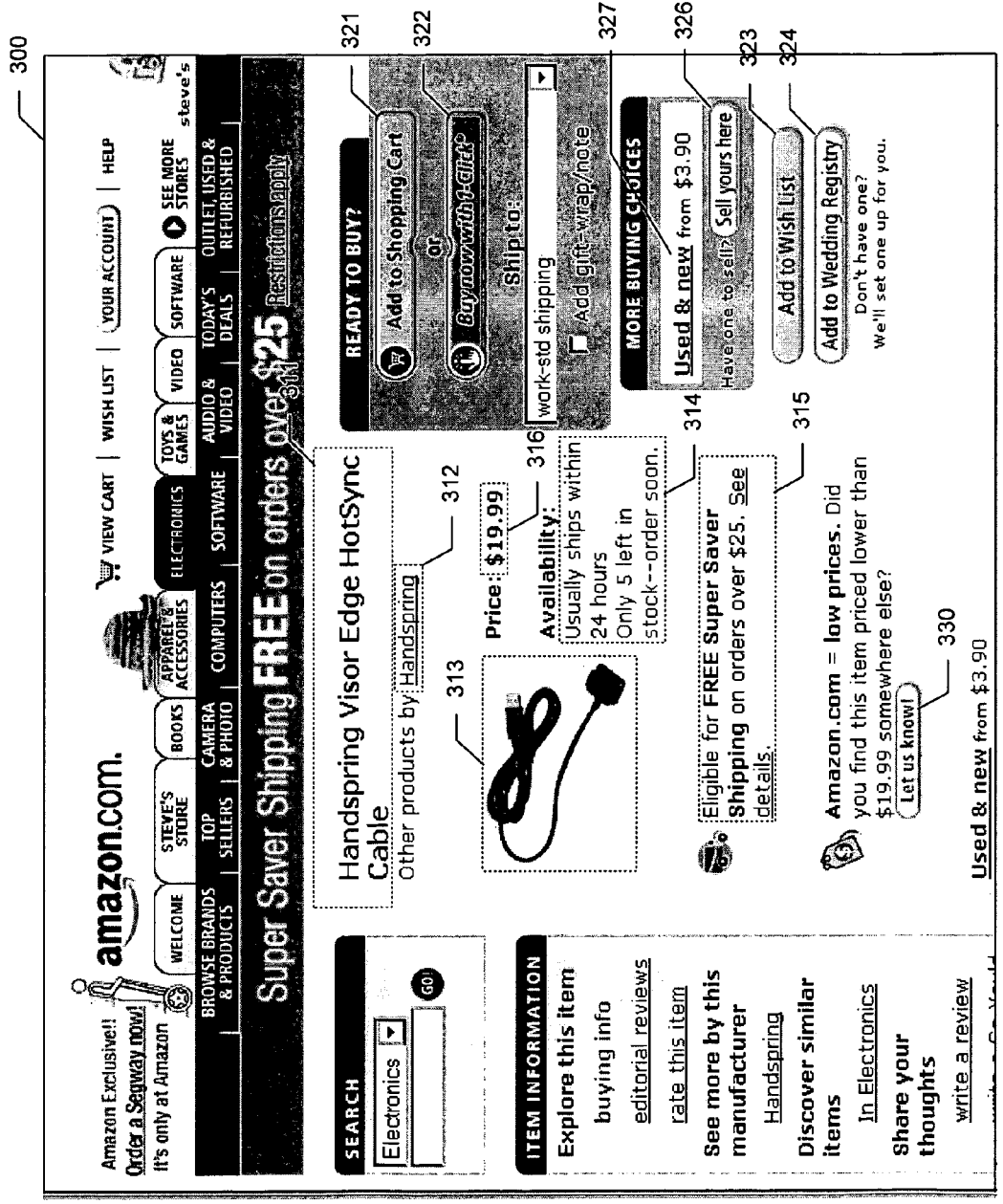
FIG. 3A is a display diagram showing a first user interface presented by some embodiments of the facility in order to solicit shopper pricing submissions.

FIG. 3A is a display diagram showing a first user interface presented by some embodiments of the facility in order to solicit shopper pricing submissions. FIG. 3A shows an item detail page 300 generated on behalf of the merchant for a particular item. The item detail page includes information describing the item, including: the item's name 311; the item's source 312; an image 313 showing the item; an indication 314 of the item's availability; an indication 315 of shipping options available for the item; and the price 316 at which the item is offered for sale by the merchant. Additionally, the item detail page includes controls 321 and 322 for purchasing the item; controls 323 and 324 for adding the item to a gift registry; a control 325 for viewing information about used units of the item that are for sale; and a control 326 for selling a used unit of the item through the merchant. The item detail page further includes a control 330 for submitting a shopper pricing submission. In the case of the first user interface, this control 330 constitutes a link to a separate web page into which competitive pricing information is entered.

FIG. 3B is a display diagram showing a second web page used in the first user interface to enable a shopper to enter competitive pricing information. In FIG. 3B, web page 340 contains information identifying the item for which a shopper pricing submission is being prepared: the name 311 of the item; the image 313 showing the item; and the current price 316 of the item. The web page further includes fields and other controls that may be used to provide the information making up the shopper pricing submission. These include a price field 341, into which the shopper enters the price at which a competitor is selling the item; a control 342 for indicating whether the price entered into the price field includes shipping and handling costs; a URL field 343 into which the shopper may enter a URL for a web page within the web site of the competitor offering the item at the entered price, such as the web site's home page, or a web page of the web site showing the entered price; and, for competitors operating from a physical store rather than a web site, a store name field 344, a city field 345, a state/province field 346, and a phone number field 347 for entering information identifying the physical store. Once the user has entered the information making up the shopper pricing submission, the user selects a submit button 348 to submit the shopper pricing submission.

Figure 3C:
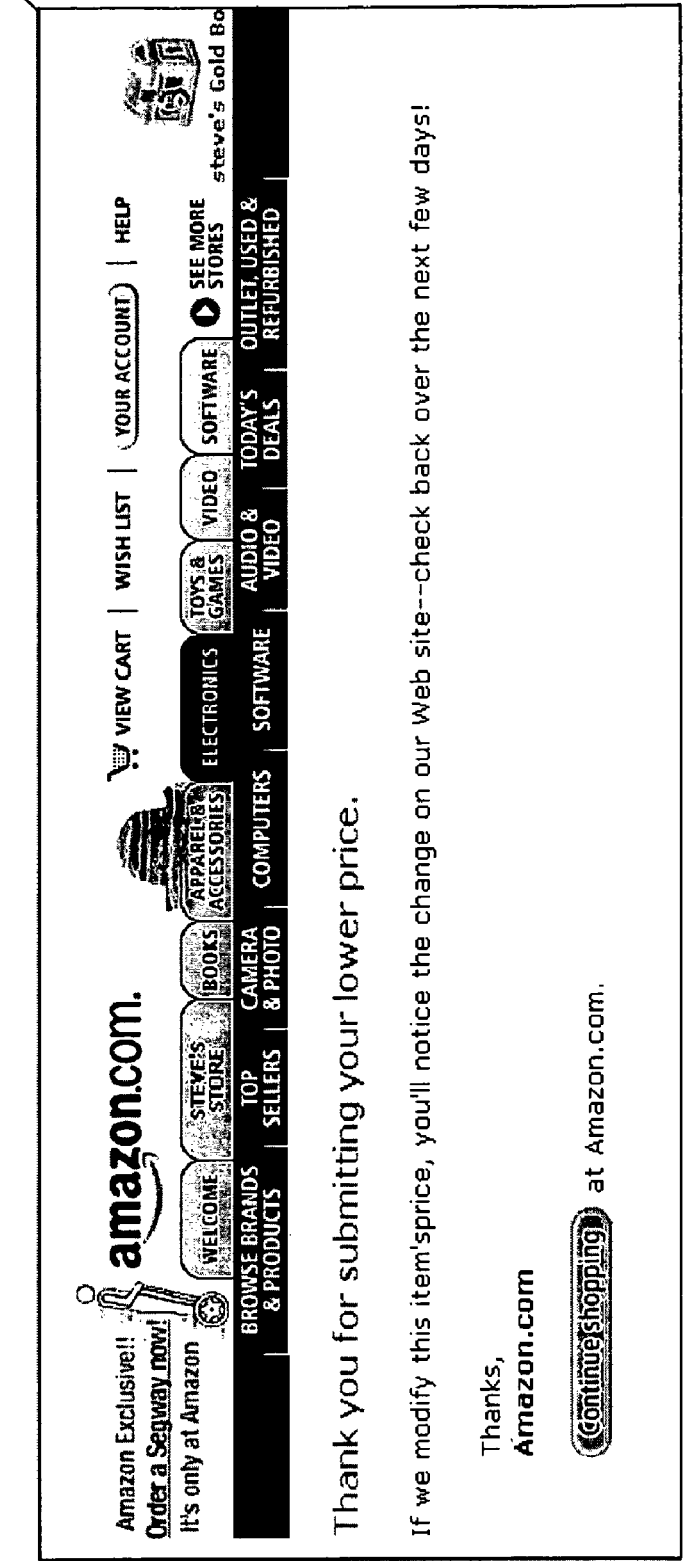
FIG. 3C shows a web page typically displayed by the facility after receiving a shopper pricing submission.

FIG. 3C shows a web page typically displayed by the facility after receiving a shopper pricing submission. The web page 350 indicates that the shopper pricing submission has been received and that the merchant may later change the price of this item in response.

Figure 4:
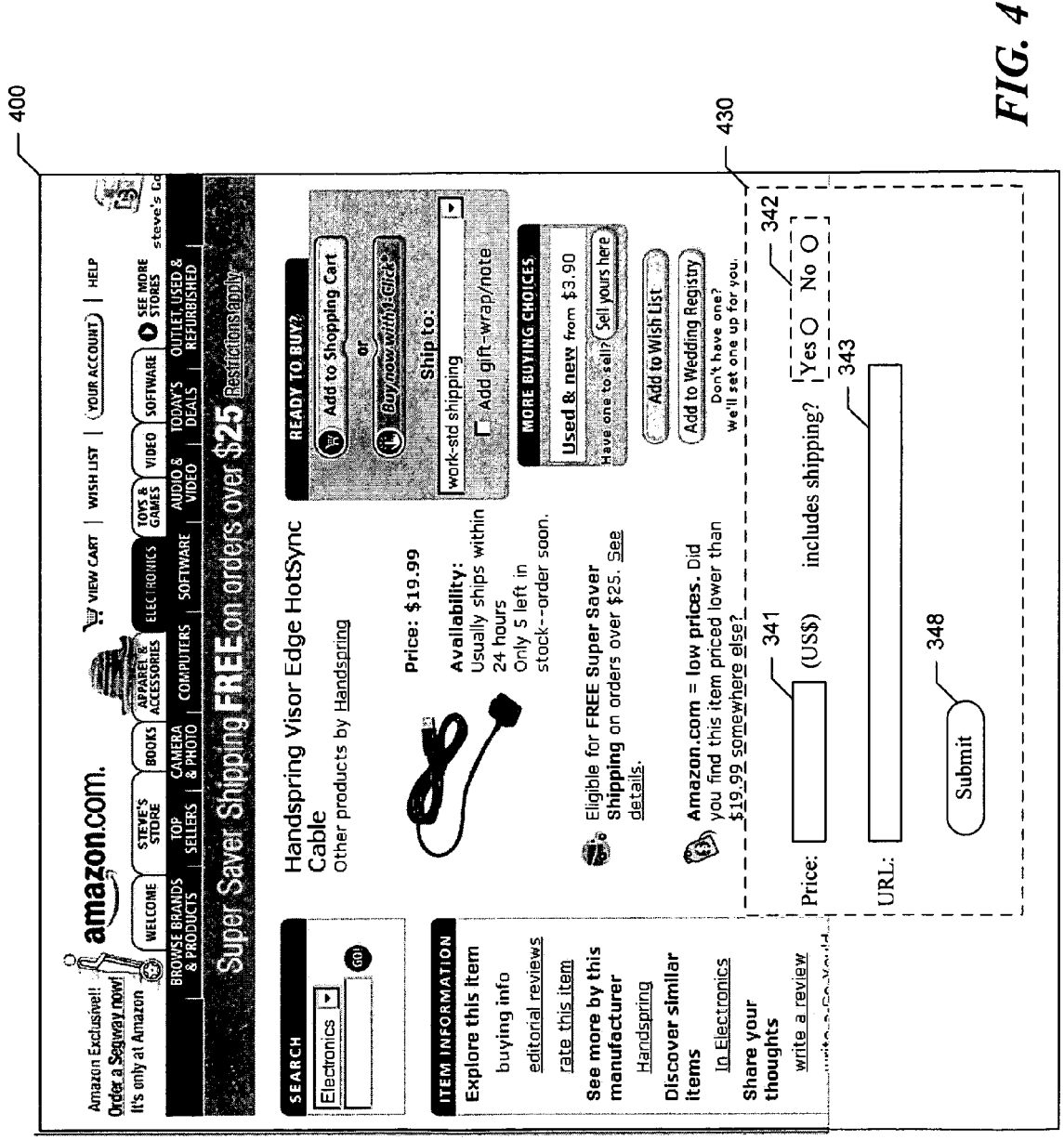
FIG. 4 is a display diagram showing a second user interface presented by some embodiments of the facility in order to solicit shopper pricing submissions.

FIG. 4 is a display diagram showing a second user interface presented by some embodiments of the facility in order to solicit shopper pricing submissions. FIG. 4 shows an item detail page 400 containing information and controls relating to the item that are similar to those described above in conjunction with FIG. 3A. The item detail page further includes a control 430 for submitting a shopper pricing submission. The control 430 is made up of a price field 341, a control 342 for indicating whether the price entered into the price field includes shipping and handling costs; a URL field 343; and a submit button 348. The user may use control 430 in order to generate and submit a shopper pricing submission without leaving the item detail page 400.

FIG. 5 is a report diagram showing a sample pricing report generated by embodiments of the facility. The report 500 is made up of a number of rows, such as rows 501-504, each corresponding to a single item sold by the merchant. Each row is divided into a number of columns: an item ID column 511 containing a unique identifier assigned by the merchant to identify this item; a number of submissions column 512 containing the number of different submissions that have been received for this item during a foregoing period of time; a merchant price column 513 containing the price currently being charged for this item by the merchant; columns showing prices being charged for this item by competitors of the merchant, such as competitor price columns 514, 515, and 516; columns containing overview information about competitor prices, such as low price column 517 and high price column 519 showing the lowest and highest price, respectively, that is being charged for this item among the merchant and its competitors, and low price seller column 518 and high price seller column 520 identifying the seller or sellers that are selling the items at the lowest and highest prices, respectively; an MSRP column 521 containing the retail price suggested for the item by its manufacturer; columns containing details about the item that are particular to the merchant, such as cost column 522 containing the merchant's cost for the item and inventory column 523 showing the number of units of the item that the merchant has in inventory; and a new merchant price column 524, into which a user of the report, such as a merchandiser employed by the merchant, can enter a new price at which the merchant will sell this item. In some cases, values contained in the report are included in the report as links that can be followed by the user of the report to display additional information about the value. These linked values are identified by being underlined. For example, item IDs in the item ID column 511 are each a link to the merchant's item detail page for the item, while the competitor prices in columns 514, 515, and 516 are each links to a web page containing the corresponding competitor's price for the item, such as the corresponding competitor's item detail page for the item.

As one example, row 502 corresponds to the item whose item detail page is shown in FIG. 3A. In column 511, row 502 contains the item ID assigned to this item by the merchant as a link that can be followed to display the item detail page shown in FIG. 3A. In the number of submissions column 512, row 502 contains the value 36, indicating that 36 different shopper pricing submissions have been received for this item in some foregoing period of time. In merchant price column 513, row 502 contains the value $19.99, indicating that this is the price currently being charged for the item by the merchant. In competitor A price column 514, row 502 contains the value $19.99, indicating that competitor A is currently charging the same price as the merchant for this item. In competitor B price column 515, row 502 contains the value $17.99, indicating that competitor B is currently charging two dollars less than the merchant for this item. In competitor C price column 516, row 502 contains the value $20.50, indicating that competitor C is currently charging fifty-one cents more than the merchant for this item. The values in columns 514, 515, and 516 are underlined, indicating that they are links that the user can follow in order to display the pages containing each of these prices for the competitor. In low price column 517, row 502 contains the value $17.99, indicating that this is the lowest price being charged for this item. In low price seller column 518, row 502 contains the value cB indicating that the lowest price is being charged by competitor B. In high price column 519, row 502 contains the value $20.50, indicating that this is the highest price being charged for the item. In high price seller column 520, row 502 contains the value cC, indicating that the highest price is being charged by competitor C. In MSRP column 521, row 502 contains the value $24.99, indicating that this is the retail price suggested for the item by its manufacturer. In cost column 522, row 502 contains the value $16.50, indicating that this is the merchant's cost for the item. In inventory column 523, row 502 contains the value 50, indicating that the merchant currently has 50 units of this item in inventory. In some embodiments, the pricing report generated by the facility contains additional information that may be useful to its users, such as: item name, item category, rebates associated with various seller's prices, availability for inventory replenishment, order rate, item detail page view rate, average price across merchants, manufacturer, distributor, contribution margin, etc.

While those skilled in the art will appreciate that the report could be sorted in a variety of other ways, it can be seen that, in the report as shown, the rows of the report are sorted in decreasing order of their number of submissions. In some cases, the user of the report may wish to treat the number of submissions for each item as a measure of the importance of repricing each item. That is, an item for which a large number of submissions has been received is likely to be an item that the merchant will sell a larger quantity of if its price is reduced to be more competitive. Accordingly, a merchandiser with a limited amount of time to consider repricing items may begin with the top row of the report and move toward the bottom of the report, stopping at the end of their time, and thus handle the most urgent item repricings. Those skilled in the art will appreciate that a variety of techniques other than row-sorting may be used to indicate the relative urgency of repricing the items listed in the report, including such techniques as visually highlighting urgent items, utilizing cursor flow control to direct the user's cursor to different rows in a particular order, etc.

In order to reprice an item, the user enters a new price for the item in the new merchant price column 524 in the row corresponding to the item. FIG. 6 is a report diagram showing a sample pricing report after a user has entered a new merchant price. In modified report 600, a user has entered the value $17.99 in new merchant price column 624, in row 602 for the HotSynch cable item. Accordingly, the facility will automatically update the price being charged by the merchant for this item to $17.99 by replacing the former price for this item among the item prices 124 stored on the web server computer system 120 with the new price.

Figure 7:
FIG. 7 is a display diagram showing a sample item detail page in which an item's price has been updated using the facility.

FIG. 7 is a display diagram showing a sample item detail page in which an item's price has been updated using the facility. As the result of replacing the item's price among the item prices stored on the web server computer system, the item detail page 700 contains the new price 716 specified for the item, $17.99. After this change takes place, users that have been waiting to purchase the item from the merchant while they perceived the merchant's price for the item to be too high may now purchase the item from the merchant.

Figure 8:
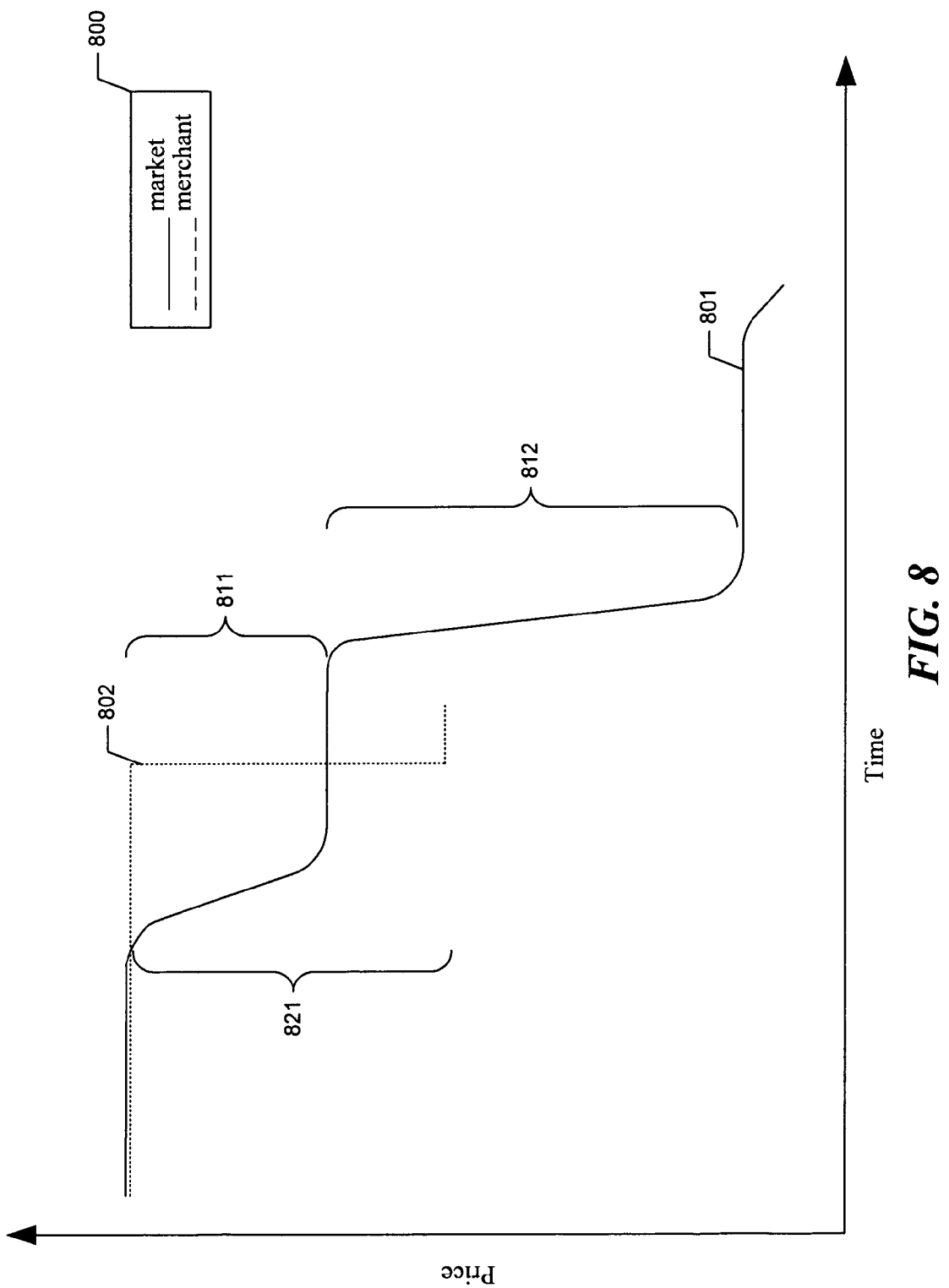
FIG. 8 is a graph showing pricing trends for a sample item.

In some embodiments, the facility uses item market price information, such as that contained in item pricing reports generated by the facility, together with various well-known pattern-matching techniques, to identify items whose market price is likely to soon drop precipitously. FIG. 8 is a graph showing pricing trends for a sample item. The graph shows prices being charged for the item on the vertical axis, and time on the horizontal axis. A market price curve 801 shows a market price being charged for the item over time. This market price is some statistical summary of prices being charged by various sellers of the item, such as mean price, median price, low price, high price, etc. Merchant curve 802 shows the price being charged by the merchant on whose behalf the facility is operating. It can be seen that the market price first undergoes a relatively small reduction 811, later followed by a relatively large reduction 812, ending up at a small fraction of the original market price for the item. Sellers that hold a significant inventory in the item after the second reduction 812 may only be able to sell their remaining units of this item below their cost, reducing, or perhaps even completely obliterating, their total profit from selling this item. To help prevent this problem, the facility uses pattern-matching techniques to predict the time and extent of the second drop 812, and recommends a reduction in the merchant's price 821 at an earlier time that is, while below the then-current market price for the item, well above the crashed market price for the item that is in effect after the second market price reduction 812, thereby enabling the merchant to sell out its inventory in the item at a price well above the crashed market price for the item. Those skilled in the art will appreciate that a variety of pattern-matching techniques may be used to compare market price data for an item under analysis to historical market price data for items, some of which have undergone significant price reductions similar to the market price crash depicted in FIG. 8.

In some embodiments, the facility assesses the relative competitive significance of different competitors based upon the number of shopper price submissions submitted for each competitor. FIG. 9 is a report diagram showing a sample competitive significance report generated by the facility. The report 900 is comprised of rows 901-905, each corresponding to a particular competitor of the merchant. Each row is divided into a competitor column 911, identifying the competitor to which the row corresponds, and a number of submissions, column 912, indicating the number of shopper pricing submissions received for that competitor in a standard foregoing period of time. For example, it can be seen in row 902 that 101 shopper price submissions have been received for competitor B. The rows of the report are sorted in decreasing order of the number of submissions. Because competitor B has the second-highest number of submissions, a user of the report may determine that competitor B is the second-most significant competitor to the merchant, behind only competitor E. Accordingly, the merchant may decide to compete more intensely with competitors E and B, such as by more vigilantly price-matching these competitors, targeting the customers of these competitors with advertising or special promotions, assigning analysts to study the behavior of these competitors, etc. Additionally, the competitive significance report generated by the facility can be used to quickly identify new competitors of the merchant, including new competitors that the merchant was unable to discover using traditional market research techniques.

It will be appreciated by those skilled in the art that the above-described facility may be straightforwardly adapted or extended in various ways. For example, the facility may be used with a wide variety of items, sellers, selling methods, and prices. A wide variety of techniques may be used by the facility in order to solicit and obtain shopper pricing submissions. In particular, differing sets of data can be collected in shopper pricing submissions. As one example, a shopper pricing submission may exclude any explicit indication of a competitor's price for an item, but rather include only information usable to determine that competitor's price, such as the URL of a page containing this price. This information may then be used by the operator of the facility to determine the competitor's price for the item, by such methods as automatically crawling the page at the supplied URL, manually browsing the page at the supplied URL, employing item pricing web services provided by the competitor, etc. Data collected via shopper pricing submissions may be combined or otherwise coordinated with pricing data obtained from a variety of different sources. The reports generated by the facility may have various contents, and contain various controls. While the foregoing description makes reference to preferred embodiments, the scope of the invention is defined solely by the claims that follow and the elements recited therein.

We claim:

1. A method in a computing system for collecting pricing information, comprising:
 in a server computer system:
  generating a web page integrally containing: (1) an identification of a selected vendor, (2) a description of a selected item that is for sale by the selected vendor at a sales price, (3) an ordering control operable to order the selected item, and (4) a competitive price information submission control operable to provide information about a sale of the selected item by a competitor of the selected vendor;
  transmitting the generated web page to a client computer system;
 in the client computer system:
  receiving the transmitted web page;
  displaying the received web page;
  receiving customer input serving to operate the competitive price information submission control contained by the displayed web page, wherein the customer input does not contain information about the identity of the selected item as part of the operation of the competitive price information submission control and wherein the customer input corresponds to input received from a user not having authority to modify the selected item's sales price;
  transmitting to the server computer system customer inputted information identifying both (1) a competitor of the selected vendor, and (2) a price charged by the competitor of the selected vendor for the selected item;

in the server computer system:
  receiving the customer inputted information transmitted by the client computer system;
  without modifying the selected item's sales price, updating a data structure containing information regarding a total number of received customer submitted competitive price submissions corresponding to the competitor of the selected vendor identified in the customer inputted information; and
  determining a priority for modifying the selected item's sales price based at least in part on the total number of received customer inputted competitive price submissions.

2. The method of claim 1, wherein determining a priority comprises:
  using the contents of the data structure to generate a report that, for each of a plurality of items, (a) shows the price at which the item is being sold by one or more competitors of the selected vendors, (b) shows the number of customer submitted price submissions for that item and that vendor, and (c) includes a control for setting a price at which the item is sold by the selected vendor;
  displaying the generated report;
  receiving customer input via a distinguished one of the controls included in the generated report specifying a price for the item for which the distinguished control is displayed;
  storing the specified price as the price at which the item for which the distinguished control is displayed is currently being sold by the selected vendor; and
  after storing the specified price in the server computer system, generating a web page containing: (1) an identification of the selected vendor, (2) a description of the item for which the distinguished control is displayed, (3) an ordering control operable to order the item for which the distinguished control is displayed, and (4) the specified price.

3. A computing system for collecting pricing information, comprising:
  a web serving-subsystem that serves to a client computing system a web page that contains both a first control operable to order a selected item from a selected vendor and a second control operable to submit a price charged for the selected item by a vendor other than the selected vendor and an identity of the vendor other than the selected vendor; and
  a receiving subsystem that receives from the client computing system information indicating that the second control has been operated by a customer to submit a customer provided price charged for the selected item by a vendor other than the selected vendor and the identity of the vendor other than the selected vendor and that updates information corresponding to a total number of customer provided submissions for at least the vendor other than the selected vendor; and
  a pricing recommendation subsystem coupled to the receiving subsystem, the pricing recommendation subsystem analyzing the customer provided price and the price charged by the selected vendor of the selected item and making a recommendation of whether to modify the price charged by the selected vendor for the selected item based at least in part on a sales price modification priority associated with the sales price, the sales price modification priority determined at least in part by the total number of customer provided submissions for at least the vendor other than the selected vendor.

4. The system of claim 3 wherein the identity of the vendor is specified by a name of the vendor.

5. The system of claim 3 wherein the identity of the vendor is specified by a URL associated with the vendor.

6. The system of claim 3 wherein the identity of the vendor is specified by a physical address associated with the vendor.

7. The system of claim 3 wherein the second control is further operable to indicate whether the submitted price includes a shipping cost of the selected item.

8. The system of claim 3 wherein the receiving subsystem further generates a report identifying the selected item and the submitted price associated with the selected item.

9. A method in a computing system for collecting pricing information, comprising:
  in a first computer system, generating a form integrally containing: (a) a description of an item that is for sale by a first seller; (b) an ordering control operable by a customer to order the item at a sales price, and (c) a comparative pricing information submission control operable by the customer to provide information about a second price charged for the item by a second seller;
  transmitting the form to a second computer system;
  receiving input from the second computer system indicating that the comparative pricing information submission control has been operated by the customer to submit information about the second price charged for the item by the second seller; and
  without automatically modifying the sales price, determining a priority of repricing the sales price of the item for sale by the first seller where the priority is based at least in part on a total number of customer submissions corresponding to the second price charged for the item.

10. The method of claim 9, wherein operation of the comparative price submission control generates a second form containing one or more data entry fields that enable the customer to specify details of the second price charged for the item by the second seller.

11. The method of claim 10, wherein one of the data entry fields is a comparative price field.

12. The method of claim 10, wherein one of the data entry fields is a vendor field for specifying the identity of the second seller that is making the comparative offer.

13. The method of claim 10, wherein one of the data entry fields is a URL field for specifying a URL to a location where the comparative offer may be found.

14. The method of claim 10, wherein one of the data entry fields is an address field for specifying a physical location where the comparative offer may be found.

15. The method of claim 9, wherein the information about a second price charged for the item by a second seller includes a comparative price.

16. The method of claim 9, wherein the information about a second price charged for the item by a second seller includes an identity of the second seller.

17. The method of claim 9, wherein the information about a second price charged for the item by a second seller includes a URL associated with a location where the second price may be found.

18. The method of claim 10, wherein the information about a second price charged for the item by a second seller includes a physical location where the second price may be found.

* * * * *

UNITED STATES PATENT AND TRADEMARK OFFICE
CERTIFICATE OF CORRECTION

PATENT NO.       : 7,660,738 B1                                    Page 1 of 1
APPLICATION NO.  : 10/425572
DATED            : February 9, 2010
INVENTOR(S)      : Siegel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 499 days.

Signed and Sealed this

Twenty-eighth Day of December, 2010

David J. Kappos
*Director of the United States Patent and Trademark Office*